United States Patent

Gates

[15] 3,691,950

[45] Sept. 19, 1972

[54] PLATE FEEDING IN DUPLICATING MACHINES

[72] Inventor: Albert George Ronald Gates, London, England

[73] Assignee: Gestetner Limited, London, England

[22] Filed: March 17, 1970

[21] Appl. No.: 20,161

[30] Foreign Application Priority Data

March 24, 1969 Great Britain..........15,406/69

[52] U.S. Cl. ................101/415.1, 53/214, 118/268, 156/447
[51] Int. Cl. .....B41f 1/30, B05c 11/124, B65b 11/02
[58] Field of Search ..........101/415.1; 118/264, 268; 156/215, 187, 446, 447, 475; 53/214; 271/47, 56

[56] References Cited

UNITED STATES PATENTS

| | | | |
|---|---|---|---|
| 2,938,319 | 5/1960 | Nystrand | 53/214 |
| 3,358,598 | 12/1967 | Middleton | 101/415.1 X |
| 2,145,072 | 1/1939 | Cooley | 101/415.1 X |
| 560,324 | 5/1896 | Pettee | 156/446 |
| 2,348,067 | 5/1944 | Hoitt | 118/264 X |

FOREIGN PATENTS OR APPLICATIONS 373,316  4/1923  Germany................101/415.1

Primary Examiner—Clyde I. Coughenour
Attorney—Spencer & Kaye

[57] ABSTRACT

A method and device for loading an offset master on to the plate cylinder of a rotary duplicating machine.

Liquid adhesive is applied to the tail of the master prior to loading thereof, on the side which after loading contacts the master cylinder of the duplicating machine, so that the tail of the master is prevented from flapping and thereby becoming damaged.

The invention is suitable for use with any form of rotary duplicating machine having an automatic clamp for engaging the leading end of a master being loaded.

6 Claims, 1 Drawing Figure

PATENTED SEP 19 1972
3,691,950
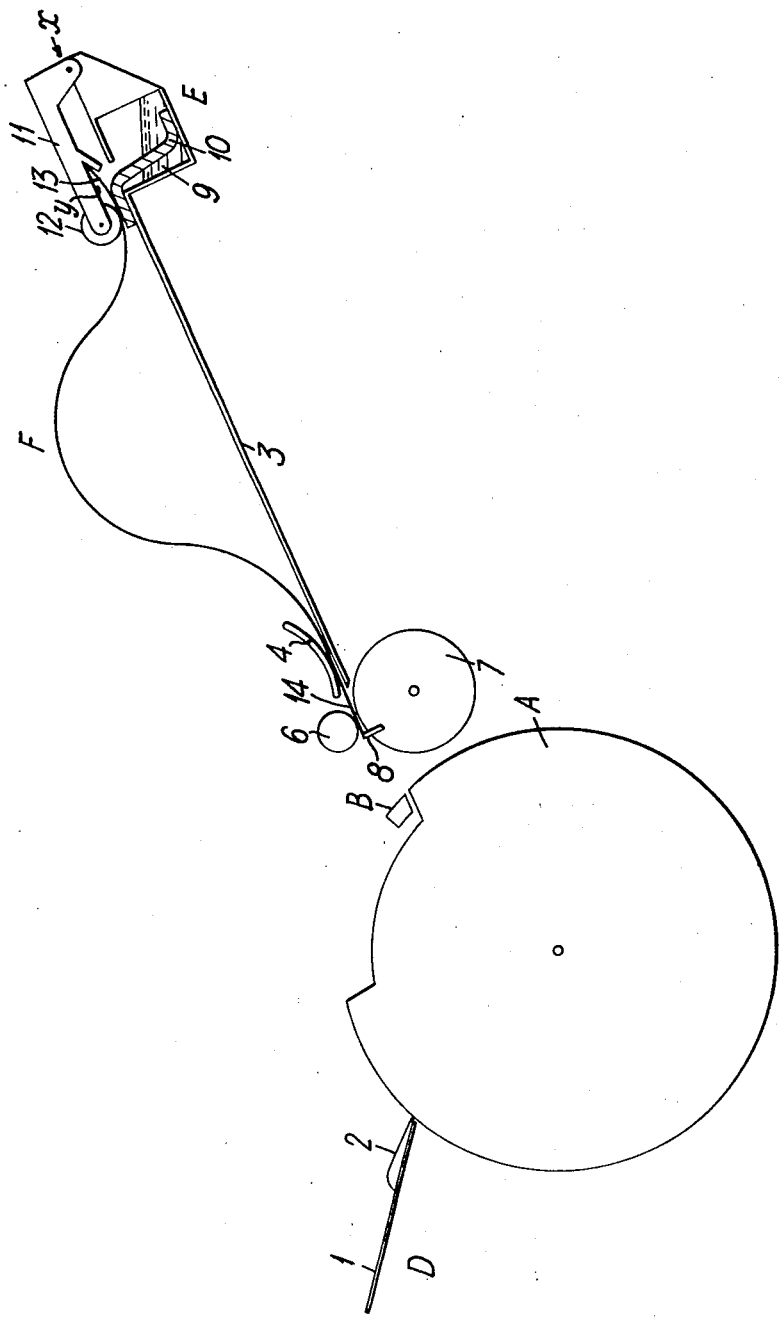
*Inventor*
Albert George Ronald Gates
BY *Spencer & Kaye*
*Attorneys.*

PLATE FEEDING IN DUPLICATING MACHINES

The present invention relates to a loading device for offset masters for use with rotary offset duplicating machines. The invention is particularly suitable for loading masters which are in the form of paper plates.

Difficulty has been experienced in the past in the automatic loading of offset masters onto the plate cylinders of offset rotary duplicating machines, in view of the fact that the tail of the master cannot be clamped since in automatic loading the master is fed onto the plate cylinder while the cylinder is in motion and the tail of the master has shown a marked tendency to flap immediately after being loaded onto such a cylinder. As a result of this, masters have become soiled, or even damaged.

According to one aspect of the present invention there is provided a method of feeding a master on to a plate cylinder of a duplicating machine, said method comprising applying, as the master is fed to the cylinder, a quantity of liquid adhesive to that side of the tail of the master which is to contact the cylinder.

According to a second aspect of the invention there is provided a master loading device for use with a rotary duplicating machine, said device including a liquid adhesive applicator positioned to apply, as a master is fed from the device, liquid adhesive to that side of the tail of a master which will be in contact with the cylinder when said master is loaded thereon.

The adhesive may be applied to the tail of a master from a reservoir which forms part of the plate loading device, for example by means of a pad partially immersed in the fluid adhesive. The tail of the master to which the liquid adhesive is being applied is preferably biassed into contact with a part of the pad which is not immersed in the liquid by means of a roller mounted on a flap which is capable of pivotal movement with respect to the reservoir. Further, means are advantageously provided to cause bowing of the master so that the tail of the latter is biassed by such bowing into contact with the pad.

A suitable slot or other device for retaining the trailing edge of the master prior to feeding thereof onto the cylinder of a rotary machine is preferably provided, advantageously in or on said flap, and such a slot may conveniently have a V-shaped cross section. Bowing of the master may then conveniently be achieved by having a stop against which the leading edge of the master engages, the distance between such stop and the slot retaining the trailing edge of the master being less than the length of the master.

Thus, the device of the invention may include a pair of feed rollers, one of which has a locating stop at a point on its periphery which can engage the leading edge of a master prior to feeding thereof to the plate cylinder, the distance between the locating stop under these conditions and the slot for retaining the tail of the master being less than the length from leading edge to trailing edge of the master itself, so that the master retains its bowed configuration while it is retained in the loading device prior to feeding.

A master guide is preferably provided at a short distance behind the leading end of the master when the master is engaged in the device of the invention prior to being fed to a rotary machine, the function of the master guide being to restrain the portion of the master adjacent the leading end against uncontrolled movement consequent upon the bowing of the master.

A rotary offset duplicating machine with which a loading device of the invention is used would have a plate cylinder with an automatic clamp, this clamp being arranged to engage the leading end of the master when the master is fed to the machine. When a loading device of the invention is used in conjunction with a master ejection device, the ejection device may conveniently consist of a tray provided with a number of extensible probes for removing a master from the plate cylinder of the machine, the arrangement being such that the ejection device operates in conjunction with the automatic clamp of the machine, so that smooth ejection of a master from the cylinder is possible.

In order that the present invention may more readily be understood, one embodiment thereof will now be described, merely by way of example, with reference to the accompanying drawing, in which the sole FIGURE shows a schematic sectional view of this embodiment in conjunction with a rotary offset duplicating machine, only the plate cylinder of which machine is shown in the FIGURE. The section of the FIGURE is taken in the plane perpendicular to the axis of rotation of the plate cylinder of the duplicating machine. In the FIGURE there is also shown a master ejection device.

Referring to the drawing, a plate cylinder of a rotary offset duplicating machine is shown at A, and an automatic master clamp associated with the cylinder A is shown at B. The cylinder A is mounted for rotation about its longitudinal axis, which extends perpendicularly to the plane of the FIGURE A pair of rollers 6 and 7 are mounted in close proximity to the cylinder A, the roller 7 being of considerably greater diameter than the roller 6, and the roller 7 also being provided with a locating stop 8 at a point on its periphery. The locating stop 8 has portions extending radially inwardly and outwardly from the circumference of the roller 7. Both the rollers 6 and 7 are of circular cylindrical configuration, and a nip is provided between them through which a master F may pass while being fed to the cylinder A.

Extending from a point adjacent the periphery of the roller 7 in a direction away from the cylinder A is a tray assembly 3, which has a down-turned portion at its end remote from the cylinder 7 for accommodating a reservoir 9 of the adhesive material for application to the tail end of master F. In the FIGURE there is shown a master F whose leading edge engages the locating stop 8 on the roller 7, and whose trailing edge engages a V-shaped slot y defined in a flap 11 pivoted at x to the body of the reservoir 9. A roller 12 is mounted for rotational movement with respect to the flap 11, and in the position shown in the FIGURE the roller 12 engages a portion of the master F near to its tail 13 engaging the slot y. A pad 10 is provided in the reservoir, having a portion immersed in liquid adhesive material located within the reservoir 9, and a further portion linking the underside of the master F at the portion thereof contacting the roller 12 with the adhesive in the reservoir 9.

Mounted in close proximity to the roller 6, and on the same side of the master F as the roller 6, is a master guide 4 having a curved configuration, whose function is to prevent uncontrolled movement of the part of the master F near its leading end 14 and consequent disengagement of the leading end 14 from the locating stop 8 on the periphery of the roller 7.

The flap 11, the reservoir 9, the pad 10 and the roller 12 together constitute an adhesive applicator E.

Mounted in close proximity to the periphery of the cylinder A, at a point separated from the roller 7 by an angle of approximately 120°, is a master ejection attachment D. The attachment D comprises a tray 1 and a row of extensible probes 2, for removal of a master from the cylinder A.

The operation of the device illustrated in the FIGURE will now be described.

With no master in position in the apparatus, the pad 10 is in position in the reservoir 9, and a sufficient quantity of liquid adhesive is present in the reservoir 9 to enable the pad 10 to operate effectively in transferring adhesive from the reservoir 9 to the tail of the master located between the pad 10 and the roller 12, the roller 12 is lifted a short distance away from the pad 10, so that the flap 11 pivots in a clockwise direction as shown in the FIGURE, to enable the tail 13 of the master F to be inserted into the slot y through the space between the roller 12 and the top end of the pad 10. When the master F has had its tail inserted into the slot y then the roller 12 is allowed to fall into contact with the upper surface of the master F, which is in turn biassed thereby into contact with the top surface of the pad 10. The leading end 14 of the master F is passed through the space between the master guide 4 and the tray assembly 3, and is retained by the location stop 8 on the roller 7. When both the leading and trailing edges of the master F have been retained respectively by the location stop 8 and the slot y, the part of the master F between its ends adopts a bowed configuration. The extent of the bow of course depends upon the distance between the location stop 8 on the roller 7 and the slot y. This distance is not critical for any given length of master, but it is desirable that the extent of the bow should be considerable.

The loading of the master F into the loading device as described above occurs while the rotary duplicator is functioning; that is, when the cylinder A is rotating. When the master F has been loaded into the loading device and engaged by the slot y and the locating stop 8, then the master F is in a position to be loaded onto the cylinder A while the rotary machine is still in operation.

The arrangement of the apparatus is such that the drive to the rollers 6 and 7 is only actuated when the cylinder A occupies a particular angular position, so that the leading end 14 of the master F, when this has been advanced towards the cylinder A, is in a position to engage the automatic clamp B.

When the cylinder A has rotated to a suitable angular location, then the drive to the rollers 6 and 7 is actuated, so that the leading end 14, of the master F is advanced away from the nip between the rollers 6 and 7, in a leftward direction as shown in the FIGURE. The leading end 14 of the master F is engaged by the automatic clamp B and then commences to describe circular motion with the cylinder A. As the remainder of the master F passes through the nip between the rollers 6 and 7, it also starts to describe rotary motion with the cylinder A, and the whole master F eventually becomes distributed around the curved surface of the cylinder A. As the master F is fed onto the cylinder A, the extent of the bow exhibited by the master F progressively becomes reduced, until a point is reached at which the portion of the master F remaining on the tray assembly 3 lies substantially straight all the way from the master guide 4 to the roller 12 mounted on the flap 11. When this point has been reached, the tension in the master F causes its tail 13 to become disengaged from the slot y defined on the flap 11, so that the tail 13 of the master F passes through the nip between the roller 12 on the flap 11 and the top end of the pad 10. When the tail 13 of the master F has passed through the nip between the roller 12 and the pad 10, then the master becomes entirely freed from the influence of the roller 12, by which time the underside of the master near the tail 13 has accepted a thin layer of adhesive from the pad 10.

While the master F is being loaded onto the cylinder A, after the clamp B has engaged the leading end 14 of the master F, the cylinder A is rotating in an anti-clockwise direction, as shown in the FIGURE. When the tail 13 of the master F has passed through nip between the rollers 6 and 7, then the master F becomes entirely freed from the influence of the rollers 6 and 7, and the tail 13 of the master F comes into contact with the curved surface of the cylinder A. By the time this occurs, the whole length of the master F has been distributed over the curved surface of the cylinder A. As the tail 13 comes into contact with the cylinder A, the layer of adhesive applied to one side of the tail 13 comes into contact with the surface of the cylinder A, and retains the tail 13 against the cylinder A, thereby preventing flapping of the tail 13 and any consequent soiling or damage to the master F. When the master F has been completely loaded onto the cylinder A, it is then free to rotate with the cylinder A a sufficient number of times to fulfil its desired application.

When it is desired to remove the master F from the cylinder A, the master ejection attachment D is brought into operation. The probes 2 of this attachment are advanced towards the surface of the cylinder A, to engage the leading end of the master F, which is at this time disposed around the curved surface of the cylinder A. When the probes 2 have disengaged the leading end of the master F from the automatic clamp B, the master F proceeds to travel along the tray 1 in a direction away from the cylinder A. Throughout this period the cylinder is continuing its anti-clockwise rotation, and when the tail 13 of the master F reaches the probes 2 it disengages from the surface of the cylinder A, so that the master F becomes entirely separated from the cylinder A. The disengagement of the tail of the master from the cylinder A can take place entirely without damage to the master F, since the properties of the particular adhesive applied to the master are chosen so that this is possible. For this purpose, an adhesive should be used which does not set hard. The properties of the adhesive used should be such that the tail 13 of the master is held firmly against the surface of the cylinder A during rotation of the master with the cylinder, but also such that the adhesive remains liquid throughout the period of this rotation, so that the master may readily be removed from the cylinder by means of the master ejection attachment.

With the exception of the loading of the master onto the loading device, all operations associated with the loading of the master onto the cylinder of the rotary duplicating machine may be carried out fully automatically.

When a loading device of the invention is employed with a rotary offset duplicating machine, considerable protection against soiling or damage is given to a master being loaded, and particularly to the tail of the master, when the master is being loaded onto the cylinder of the machine.

Many adhesives, such as a Gum Arabic adhesive, are suitable for fixing the tail of a master to the plate cylinder.

What I claim is:

1. In or for duplicating apparatus having a plate cylinder, a device for loading onto said plate cylinder a printing master having a cylinder contact face, a remote face, a leading end and a tail, said device comprising:
   a. tray means for supporting said printing master with its leading end adjacent said plate cylinder;
   b. applicator means for applying liquid adhesive to the cylinder contact face of the printing master, said applicator means comprising a reservoir for liquid adhesive and an absorbent pad positioned to be partly immersed in said liquid adhesive and partly exposed for contact with the printing master to be loaded;
   c. means for biasing the printing master against said pad;
   d. roller means for feeding said leading end towards said plate cylinder; and
   e. releasable stop means for holding said leading end prior to feeding by said roller means.

2. A method of loading a printing master onto a plate cylinder of a duplicating machine, said method comprising the steps of:
   a. feeding said master towards said cylinder;
   b. applying, during said feeding step, a quantity of liquid adhesive to the tail of said master;
   c. mounting the leading end of said master on the cylinder;
   d. bringing the adhesive bearing tail of said master into contact with said cylinder; and
   e. stripping the printing plate from the cylinder before the liquid adhesive dries.

3. A method as specified in claim 2, and including the step of bending said master into a bowed configuration prior to said feeding step.

4. A method as specified in claim 2, wherein said liquid adhesive is applied to said tail by the step of contacting the master with a wicking pad before said step of feeding the master towards the cylinder.

5. A method as specified in claim 4, wherein said feeding step consists of dragging the master leading end forward positively before mounting on the cylinder, to drag the tail of the master across said wicking pad.

6. In or for duplicating apparatus having a plate cylinder, a device for loading onto said place cylinder a printing master having a cylinder contact face, a remote face, a tail and a leading end, said device comprising, in combination:
   i. master leading end retaining means comprising a pair of rollers and stop means defined on one of said rollers;
   ii. master tail retaining means;
   iii. support means for positioning said master leading end retaining means and said master tail retaining means in spaced apart relation;
   iv. means for feeding said leading end of said master to said plate cylinder; and
   v. means for applying liquid adhesive to said cylinder contact face to said master at said tail thereof.

* * * * *